G. A. EDWARDS.
STRAW CUTTER.
No. 77,599. Patented May 5, 1868.
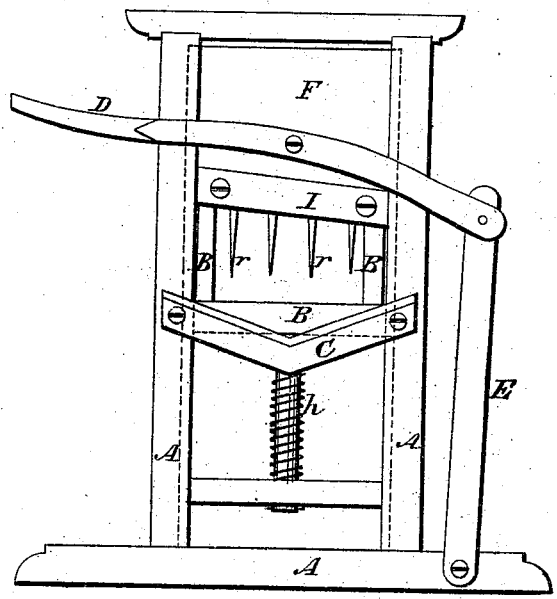
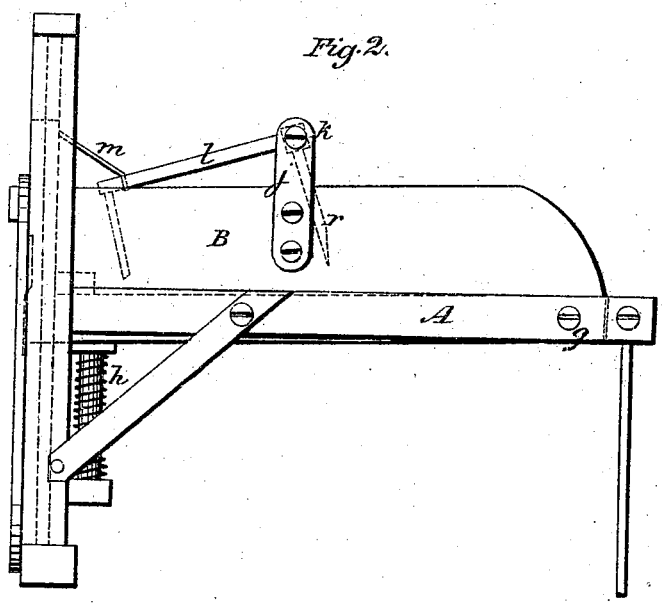
Witnesses
V. D. Stockbridge
A. N. Marr.
Inventor.
George A. Edwards
per
Alexander & Mason
attys.

United States Patent Office.

GEORGE A. EDWARDS, OF CENTRALIA, ILLINOIS.

Letters Patent No. 77,599, dated May 5, 1868.

IMPROVEMENT IN STRAW-CUTTER.

The Schedule referred to in these Letters Patent and making part of the same.

TO ALL WHOM IT MAY CONCERN:

Be it known that I, GEORGE A. EDWARDS, of Centralia, in the county of Marion, and in the State of Illinois, have invented certain new and useful Improvements in Straw-Cutters; and do hereby declare that the following is a full, clear, and exact description thereof, reference being had to the accompanying drawings, and the letters of reference marked thereon.

In the annexed drawings, making a part of this specification, A represents a frame, of any desired dimensions, and made of any suitable material; and B represents a movable box, pivoted between the sides thereof, at $g$, so that the front end of it may work up and down, as may be required.

The front posts of the frame A are grooved, so as to form ways for the sliding head F to work up and down in.

Said sliding head F is made, with tongues, to fit in the grooves of the posts, and has secured to its lower side a straight knife, I, set at a slight angle with the head, so as to give something of a shear-cut when operated.

C represents a bent or curved knife, made in the shape shown on the drawings, and made fast to the front posts of the frame A in any suitable manner.

E represents a movable arm, pivoted to the base of the frame A, and projecting upward, and supports the lever D, which is pivoted to it.

The lever D is pivoted to the head, F, and arm E, as shown, and is used to operate said head, F, and the knife I, for cutting hay and straw.

Extending down from the bottom of the box B is a suitable post, which passes through a cross-bar of the frame A, as shown, and around which I adjust a spiral spring, $h$, to throw the box up when relieved from the pressure of the hay while cutting the same.

Secured to the sides of the movable box B are arms $j\,j$, in the top of which I adjust a shaft, K.

The shaft K is provided with a series of teeth or forks, $r\,r$, projecting down into the box, and, when operated back and forth, feeds the hay or straw into or between the knives.

Extending forward from the shaft K, and at right angles with the teeth $r\,r$, is an arm, $l$, which is held and operated by means of the cord $m$, said cord $m$ being secured to the extremity of the arm $l$, and to the movable head, F, as shown in the drawings.

Having thus fully described my invention, what I claim as new, and desire to secure by Letters Patent, is—

The arrangement of the pivoted box B upon the coil-spring $h$ and its shaft K, having rakes $r\,r$, that are operated by the lever $l$ and cord $m$, and used in combination with the sliding head F, inclined knife I, and the angular knife C, on the frame A, all constructed and used as specified.

In testimony that I claim the foregoing, I have hereunto set my hand, this 29th day of February, 1868.

GEORGE A. EDWARDS.

Witnesses:
   WM. B. MATTHEWS.
   S. L. HAND.